Patented Apr. 30, 1929.

1,711,324

UNITED STATES PATENT OFFICE.

ARTHUR H. OSTERLUND, OF ST. PAUL, MINNESOTA.

ANTIFREEZING COMPOSITION.

No Drawing.  Application filed August 24, 1925. Serial No. 52,227.

This invention relates to an anti-freezing composition, particularly, although not exclusively, adapted to be circulated in the cooling systems of motors, such as those of automobiles, aeroplanes and the like.

Numerous substitutes for water as a cooling agent for motors have been devised, but as far as I am aware, none of the substances heretofore tried for this purpose meet all of the requirements of such a compound. Such compounds or solutions have been either too expensive to be practical or have had the disadvantages of boiling at relatively low temperatures or solidifying at temperatures above those to which the motors are subjected in cold climates. Other compounds heretofore tried for this purpose are corrosive or otherwise detrimental to metal or rubber parts of the motors.

The object of this invention is to provide an inexpensive, non-corrosive anti-freezing composition which has an unusually high boiling point and low freezing point.

In carrying out my invention, I first prepare a quantity of sodium glycero-phosphate, $Na_2C_3H_5(OH)_2PO_4$, by proceeding as follows: to a saturated, aqueous solution of diabasic sodium phosphate, $Na_2HPO_4$, glycerine, $C_3H_5(OH)_3$, is added, and boiled therewith for 15 minutes. Approximately the theoretically correct proportions of these substances, or about two parts of glycerine to three parts of diabasic sodium phosphate, are thus combined to produce sodium glycero-phosphate, which is the principal ingredient of my product.

In proceeding further, I prefer to utilize the sodium glycero-phosphate, thus prepared, and the other substances of the following list in about the proportions by weight as stated, viz:

| | Per cent. |
|---|---|
| Sodium glycero-phosphate $Na_2C_3H_5(OH)_2PO_4$ | 30 |
| Carbon tetrachloride $CCl_4$ | 2 |
| Glycerine $C_3H_5(OH)_3$ | 10 |
| Water $H_2O$ | 60 |

The aqueous solution of sodium glycero-phosphate, is now subjected to heat sufficient to boil the same, a temperature of about 218 degrees F. being sufficient. The glycerine is then stirred in and the mixture is allowed to cool to approximately 105 degrees F., when all of the other ingredients listed above are added and thoroughly mixed with the sodium glycero-phosphate and glycerine. The resulting solution is now allowed to stand so that the carbon tetrachloride will settle to the bottom and, together with impurities, may be drawn off, leaving the main solution ready for use.

Carbon tetrachloride is utilized in my process as a settling agent to clarify the solution of impurities, which are sometimes present in the constituent substances, when obtained as commercial products. Thus, commercial glycerine can be used to good advantage in my process but it frequently contains about two per cent of impurities which should be removed to give a clear product. Further, where the water incorporated in the product contains hardening salts the product is given a cloudy appearance if the clarifying step is omitted. The settling agent does not remain in appreciable quantities in the final product. Separation of the settling agent from the solution is facilitated by the fact that the specific gravity of carbon tetrachloride is greater than that of the other ingredients, so that it may be readily drawn off from the bottom of a container of the solution. Obviously, where substantially pure ingredients are available, no clarifying agent is necessary, and it will be further evident to those skilled in this art that clarifying agents, other than carbon tetrachloride may be employed. Therefore, I do not wish to limit my invention to a process in which carbon tetrachloride is employed.

As is well known, the use of glycerine in an aqueous solution as an anti-freezing compound is unsatisfactory because of the tendency of glycerine to separate from the water when allowed to stand, with resulting freezing of the water in cold weather. However, by incorporating my sodium glycero-phosphate, which is readily miscible with both glycerine and water, I have found that the solution is so improved that it shows no tendency to separate into its component substances, and a perfectly stable and homogeneous product results. The glycerine in my product acts as a freezing temperature depressant.

The product of the present invention, if subjected to agitation, may be gradually solidified as the temperature applied is reduced below about minus 35 degrees F. When heated above the boiling point of water, the water constituent vaporizes, but the other ingredients remain unchanged and do not boil until a very much higher temperature is reached. The composition is non-corrosive to metals and is less viscous than a solution of glycerine and water, having an equally low freezing point. Thus, my product is adapted to be readily circulated in the cooling systems of motors.

The proportion of the glycerine and sodium glycero-phosphate, above stated, may be varied between wide limits according to the conditions of use and climate, but where used as a motor cooling fluid, I believe that best results will be obtained by maintaining the sodium glycero-phosphate between 20 and 50 per cent of the total weight of the solution.

In addition to its employment as a cooling agent for motors, my product may be used in refrigerating plants in place of brine or other freezing temperature depressant. I have also found that a relatively dilute solution of my product makes an excellent cleaner for windows or other glazed or non-absorbent surfaces. When so used, about a five per cent aqueous solution of the product is incorporated with about one-half of one per cent of a soluble diabasic carbonate, such as disodium carbonate, $Na_2CO_3$.

Having described my invention what I claim as new and desire to protect by Letters Patent is:

1. An anti-freezing composition for circulating in the cooling systems of motors comprising sodium glycero-phosphate and glycerine in a solution which does not solidify above minus thirty five degrees Fahrenheit.

2. An anti-freezing composition comprising an aqueous solution containing in excess of five per cent by weight of a glycerol derivative of an alkali salt.

3. The process of preparing an anti-freezing composition comprising boiling sodium glycero-phosphate and incorporating glycerine therewith, subsequently cooling the mixture and adding a clarifying agent thereto to remove impurities, and finally drawing off the greater part of said agent and impurities.

4. The process of preparing an anti-freezing composition comprising adding water to sodium glycero-phosphate and boiling the same, then adding glycerine thereto, subsequently cooling the mixture and adding carbon tetrachloride thereto to clarify the solution, and finally drawing off a greater part of the carbon tetrachloride.

5. An anti-freezing composition comprising an aqueous solution containing in excess of five per cent by weight of a glycerol derivative of an alkali salt and a glycerine.

In testimony whereof, I have hereunto signed my name to this specification.

ARTHUR H. OSTERLUND.